C. SHARPS.
Breech-Loading Fire-Arm.
No. 1,720. Reissued July 5, 1864.
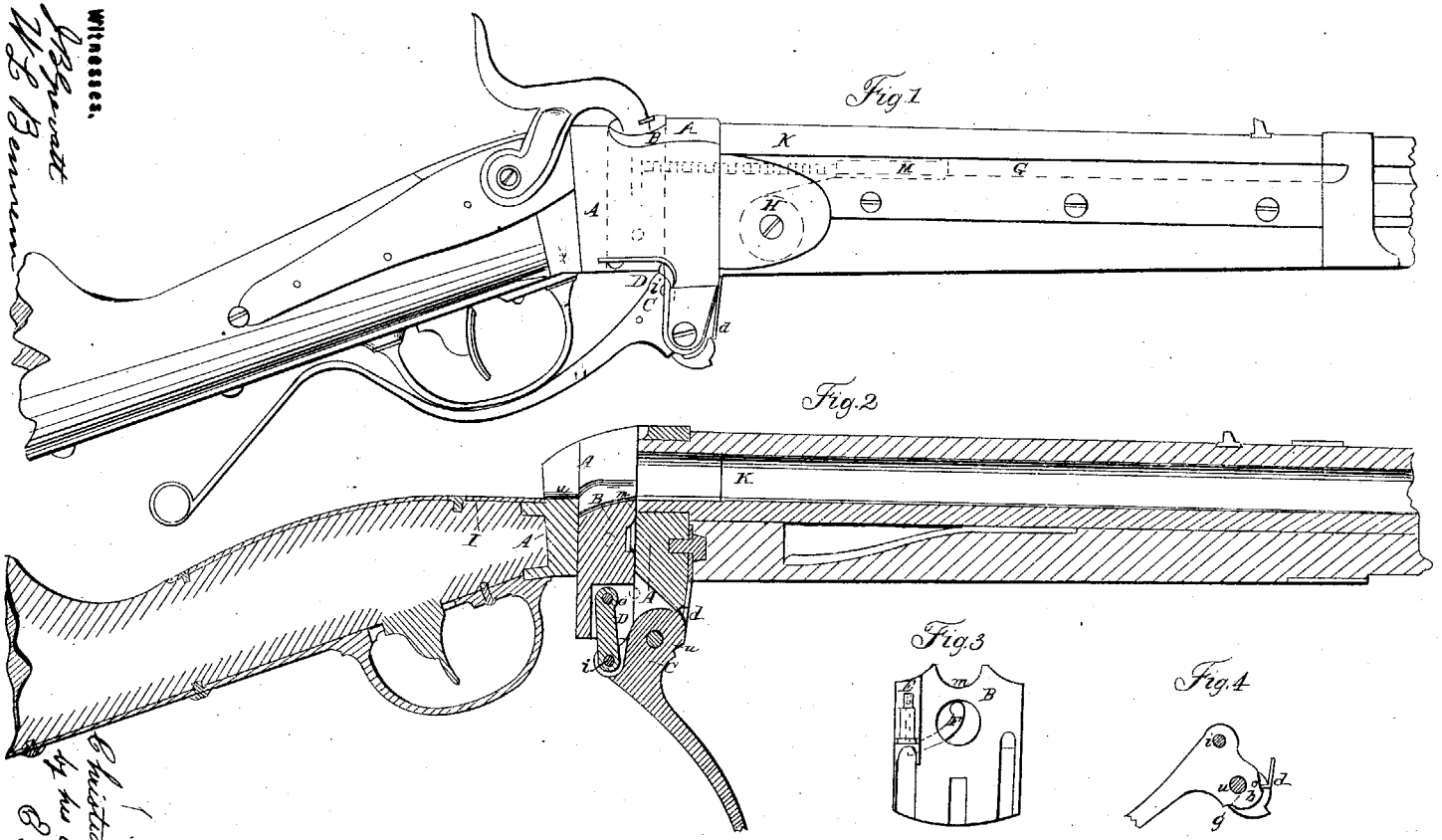
Witnesses.
J B Prevatt
W L Bennem
Inventor.
Christian Sharps.
by his attorney
E S Renwick
N. PETERS, PHOTO-LITHOGRAPHER, WASHINGTON, D. C.

UNITED STATES PATENT OFFICE.

CHRISTIAN SHARPS, OF PHILADELPHIA, PENNSYLVANIA, ASSIGNOR TO SHARPS RIFLE COMPANY, OF HARTFORD, CONNECTICUT.

IMPROVEMENT IN BREECH-LOADING FIRE-ARMS.

Specification forming part of Letters Patent No. 5,763, dated September 12, 1848; extended August 25, 1862; Reissue No. 1,720, dated July 5, 1864.

*To all whom it may concern:*

Be it known that I, CHRISTIAN SHARPS, formerly of Cincinnati, in the State of Ohio, now of Philadelphia, in the State of Pennsylvania, invented a new and Improved Breech-Loading Gun; and I do hereby declare that the following is a full, clear, and exact description of my said invention, reference being had to the accompanying drawings, in which—

Figure 1 represents a side view of certain parts of a rifle-gun embodying my invention, with a self-capping attachment applied to it. Fig. 2 represents a vertical longitudinal section, showing certain parts of the gun. Fig. 3 represents a front view of the slide which closes the breech of the barrel detached from the gun, and Fig. 4 represents a side view of the head of the controlling-lever of the slide which secures the breech.

The nature of my invention will fully appear from the following description of the rifle-gun which I made to embody it, and from the claims at the end of said description.

The barrel K of this gun is open at the breech, and is counterbored to form a chamber in which the cartridge is to be inserted. Its breech is secured to the supporter and receiver A of the slide B by brazing or screwing, so that the receiver and barrel may be dressed up separately to their finished forms, and then be put together without distorting their forms. The receiver A is slotted or mortised transversely to the line of the bore of the barrel, to permit the slide B, which is a movable stopper for closing the open breech of the barrel, to move up and down across the breech, so that when the slide is raised it secures the open breech of the barrel and confines the charge therein. The receiver and the stock are so formed in the rear of the bore that the cartridge may be readily moved forward past them in line with the bore, or thereabout, when the gun is to be charged, the part of the receiver A back of the slide B having a round-bottomed groove, *a*, cut in its upper side, and the portion of the stock I of the gun which is behind the slide B being depressed or cut away. The groove *a* in the receiver is narrower than the slide B, so that a sufficient bearing is left at each side of the slide to sustain it against the strain resulting from the discharge of the cartridge. The slide is perforated, as indicated at F, to permit the fire rom the percussion-cap to pass through it nto the chamber of the gun, and it is fitted with a nipple or cone, E, to which the cap is applied. The slide B is connected by a link, D, with a lever, C, arranged beneath the stock, and pivoted at its front end to a projection depending from the receiver A, so that the slide can be drawn down to open the breech of the barrel, or can be raised by moving the lever C, which controls it. This controlling-lever C is so constructed and combined with the slide B that when the slide B is raised to its position for securing the breech of the barrel the application of any force to the slide does not tend practically to move the controlling-lever out of its position, the part of the lever which is connected with the slide being then over its fulcrum-pivot *u*, and the two pivots *e i* and the link D, which combine the lever with the slide, being then in the same straight line, or thereabout) with the fulcrum-pivot *u* of the lever C. The head of the lever C has two notched shoulders, *b*, one at each side, and a forked spring, *d*, is secured to the receiver A, with its forked ends in such positions that when the controlling-lever C is raised to its highest position they engage in the notches *c* (at opposite sides of that lever) and hold the lever in its highest position, thereby holding the slide B in its place and preventing the controlling-lever from accidentally dropping and withdrawing the slide. The other notch, *g*, of each of the shoulders is in such a position relatively to the adjacent end of the spring *d* that when the slide has been withdrawn by the depression of the controlling-lever to a proper position for permitting the introduction of the cartridge into the open breech of the barrel the ends of the spring, engaging in these notches *g* at opposite sides of the lever, hold the lever in its depressed position. In order that any part of the cartridge which may project beyond the breech of the barrel may be sheared off, the upper forward rim, *m*, of the slide B is formed into a shearing-edge, which, operating upon the projecting end of the cartridge when the slide is raised, shears off said projection and exposes the charge therein. There is a tube, G, attached to the side of the barrel and parallel therewith, some eight or ten inches long, with one end passing through a portion of the receiver and supporter A and half-way across the mortise or slot therein. This tube has a cross-hole at the end, which will admit the cap-nipple to pass up sufficiently to carry a cap above the surface of the tube G when the gun is breeched. There is a small cord attached to a follower, M, which passes through the stationary tube G, the cord winding round a cylinder, H, inclosing a watch-spring. This cylinder turns on a stud made fast to a metallic plate, which is placed under the tube G, against the supporter A, and which plate is made fast to the front part of the stock. The gun-stock is made in two pieces—the one in front of the receiver A, the other behind it. The back part of the stock may be secured by break-off or iron plates secured to the receiver A in such a manner as to come on the upper and lower surfaces of the stock, and be made fast in the ordinary way, the lock being the common back-action lock. The remainder of the gun may be finished in the ordinary manner. To charge the stationary tube G with caps, the follower M must be drawn to the mouth of the tube G, which is done with the rod of the gun. Then insert the caps and replace the follower in the tube. This will always exert a pressure on the caps, which will cause one to occupy the cross-hole in the tube G when the nipple is withdrawn by the movement of the slide B, and as the nipple is returned it takes on the cap.

To use this gun, prepare a cartridge by making a paper tube nearly the size of the counterbore of the barrel. Into one end of the tube put a ball with a patch drawn over it. The paper tube may pass over the folds of the patch and be tied with a thread. This paper tube, being then charged with powder, may be closed by tying. Now, by moving the hinder end of the lever downward, the breech of the barrel will be opened to receive the cartridge. In the meantime a cap will be placed by the follower in the cross-hole of the tube G. All that is necessary then is to insert the cartridge and return the lever to its place, whereupon the gun will be loaded and capped.

The advantages of the gun are, first, that the making of the barrel and receiver in separate pieces and then uniting them by brazing or screwing admits of these parts being manufactured economically and put together without danger of distortion of form, while at the same time their attachment to each other is firm and secure; second, that from the construction and relative arrangement of the barrel, slide, receiver, and stock, as described, a cartridge may be inserted in line with the axis of the barrel, or thereabout, whereby time is saved and danger of breaking or bending the cartridge is obviated; third, that the arrangement and combination of the slide and controlling-lever are such that the force of the discharge or any other power applied to the slide cannot move it when it fully secures the breech, thereby making the gun safer; fourth, that the controlling-lever is held sufficiently firm when the breech is secured to prevent it from dropping and moving the slide while the gun is being carried about after loading and prior to discharging; fifth, that the controlling-lever is held in its proper place when the slide is depressed, thereby facilitating the loading of the gun; and, lastly, by forming the forward rim of the slide into a shearing-edge, ordinary cartridges can be used in the gun without the necessity of tearing or piercing them, as their ends are sheared off to expose the powder by the act of closing the breech, so as to insure a firing of the chrrge.

Having thus described the rifle-gun which I made to embody my improvements, what I claim as my invention, and desire to secure by Letters Patent, is—

1. The combination of a gun-barrel open at the breech, and a slide movable across said breech to close it, with a receiver for the slide and the stock, constructed in such manner that the cartridge may be inserted into the bore of the barrel by moving the cartridge forward past the stock and receiver in line, or thereabout, with said bore, substantially as set forth.

2. The combination of a gun-barrel open at the breech, a slide movable across said breech to close it, a receiver for said slide, and a controlling-lever, the whole operating in such manner that when the breech is secured the application of pressure to the slide does not tend practically to displace the controlling-lever from its position, substantially as set forth.

3. The combination of the slide movable across the breech of the gun-barrel to close it, and a lever to control the same, with a spring operating to hold said lever in its position when the breech of the barrel is secured by the slide, substantially as set forth.

4. The combination of the slide movable across the breech of a gun-barrel to close it, and a lever to control the same, with a spring operating to hold said lever in its position when the breech of the barrel has been opened, substantially as set forth.

5. The combination of a gun-barrel open at the breech, and a receiver for the slide, with a slide which is both movable across said breech and is furnished with a knife-edge to shear off the projecting butt of the cartridge, substantially as set forth.

In witness whereof I have hereunto set my hand.

CHRISTIAN SHARPS.

Witnesses:
HENRY HOWSON,
CHARLES HOWSON.